(12) United States Patent
Huff et al.

(10) Patent No.: US 12,351,489 B2
(45) Date of Patent: Jul. 8, 2025

(54) SEPARATOR SYSTEM FOR USE IN AGRICULTURAL PROCESSING

(71) Applicant: SAFE FOODS CORPORATION, North Little Rock, AR (US)

(72) Inventors: Steve Huff, Sherwood, AR (US); Todd Coleman, Batesville, AR (US); Douglas M. Dawson, Sherwood, AR (US); Anthony Nguyen, Benton, AR (US)

(73) Assignee: Safe Foods Corporation, North Little Rock, AR (US)

( * ) Notice: Subject to any disclaimer, the term of this patent is extended or adjusted under 35 U.S.C. 154(b) by 790 days.

(21) Appl. No.: 17/454,908

(22) Filed: Nov. 15, 2021

(65) Prior Publication Data

US 2023/0150840 A1 May 18, 2023

(51) Int. Cl.
*C02F 1/38* (2023.01)
*A22C 21/04* (2006.01)
(Continued)

(52) U.S. Cl.
CPC ............. *C02F 1/38* (2013.01); *A22C 21/04* (2013.01); *C02F 1/385* (2013.01); *C02F 9/00* (2013.01); *C02F 2103/20* (2013.01); *C02F 2103/22* (2013.01); *C02F 2209/005* (2013.01); *C02F 2209/02* (2013.01); *C02F 2209/05* (2013.01); *C02F 2209/06* (2013.01); *C02F 2209/11* (2013.01); *C02F 2209/36* (2013.01); *C02F 2209/40* (2013.01); *C02F 2301/046* (2013.01); *C02F 2301/08* (2013.01); *C02F 2303/24* (2013.01)

(58) Field of Classification Search
CPC . A22C 21/04; C02F 1/38; C02F 1/385; C02F 9/00; C02F 2103/20; C02F 2103/22; C02F 2209/005; C02F 2209/02; C02F 2209/05; C02F 2209/06; C02F 2209/11; C02F 2209/36; C02F 2209/40; C02F 2301/046; C02F 2301/08; C02F 2303/24
See application file for complete search history.

(56) References Cited

U.S. PATENT DOCUMENTS

| 4,462,899 A | 7/1984 | Wambsgans |
| 4,852,215 A | 8/1989 | Covell, III |
| (Continued) | | |

FOREIGN PATENT DOCUMENTS

WO    WO 2019/035999 A1    2/2019

OTHER PUBLICATIONS

International Search Report and Written Opinion issued by the United States Patent and Trademark Office as International Searching Authority for PCT/IB2022/060411, dated Feb. 24, 2023, 11 pgs.

*Primary Examiner* — John Kim
(74) *Attorney, Agent, or Firm* — Haynes and Boone, LLP; Randall C. Brown; Michael Tobin

(57) ABSTRACT

An agricultural processing system includes a process that uses water and produces wastewater having insoluble solids, a pump configured to receive and pressurize the wastewater from the process, and a plurality of centrifugal separators connected in parallel and configured to receive the wastewater from the pump. The separators are each configured to separate out the insoluble solids from the wastewater to produce a cleaned wastewater.

7 Claims, 6 Drawing Sheets

(51) Int. Cl.
  *C02F 9/00*  (2023.01)
  *C02F 103/20*  (2006.01)
  *C02F 103/22*  (2006.01)

(56) References Cited

U.S. PATENT DOCUMENTS

| | | |
|---|---|---|
| 5,605,503 A | 2/1997 | Martin |
| 6,395,181 B1 | 5/2002 | Mullerheim |
| 2003/0013401 A1 | 1/2003 | Caracciolo, Jr. |
| 2003/0094422 A1 | 5/2003 | Perkins et al. |
| 2003/0205514 A1 | 11/2003 | Potter et al. |
| 2008/0076619 A1 | 3/2008 | Scott et al. |
| 2011/0027437 A1 | 2/2011 | Liimatta |
| 2014/0144836 A1 | 5/2014 | Nyhuis et al. |
| 2018/0370809 A1 | 12/2018 | Lee |
| 2020/0131068 A1 | 4/2020 | McNaughton et al. |
| 2020/0369547 A1 | 11/2020 | Davy et al. |
| 2023/0054607 A1* | 2/2023 | Henley .............. B01D 17/0208 |

* cited by examiner

SEPARATOR SYSTEM FOR USE IN AGRICULTURAL PROCESSING

FIELD OF THE DISCLOSURE

The present disclosure relates to removal of insoluble materials from aqueous streams used in agricultural processing. More particularly, the application relates to removal of insoluble materials from aqueous streams used in agricultural processing using a centripetal force-based solid/liquid separator.

BACKGROUND

Poultry processing establishments transform a live animal to a whole bird or individual parts for consumption by the general population. The process of this transformation requires multiple unit operations that involve large volumes of water. During the various processing steps, the water streams become contaminated with solids such as feathers, ingesta, and fecal matter as well as insoluble liquids such as lipids.

In order to ensure a safer food supply for the general population, the United States Department of Agriculture (USDA) has established microbial performance standards for these establishments. Antimicrobial interventions are used at the various unit operations to aid in microbial reduction, allowing the establishments to achieve the performance standards. However, the presence of solid and liquid contaminants from the process can also interact with the antimicrobials, especially oxidizers such as peracetic acid (PAA), rendering the antimicrobials less effective. In addition, the solids, such as feathers and fecal matter, contain bacteria that can increase the microbial load that will need to be treated downstream. Solids, such as ingesta, and liquids, such as insoluble fat, can serve as food sources for microbes. These issues can increase the difficulty for establishments to achieve the USDA microbial performance standards.

BRIEF DESCRIPTION OF THE DRAWINGS

Various embodiments of the present disclosure will be understood more fully from the detailed description given below and from the accompanying drawings. In the drawings, like reference numbers may indicate identical or functionally similar elements. Embodiments are described in detail hereinafter with reference to the accompanying figures, in which.

DETAILED DESCRIPTION

Figure 1:
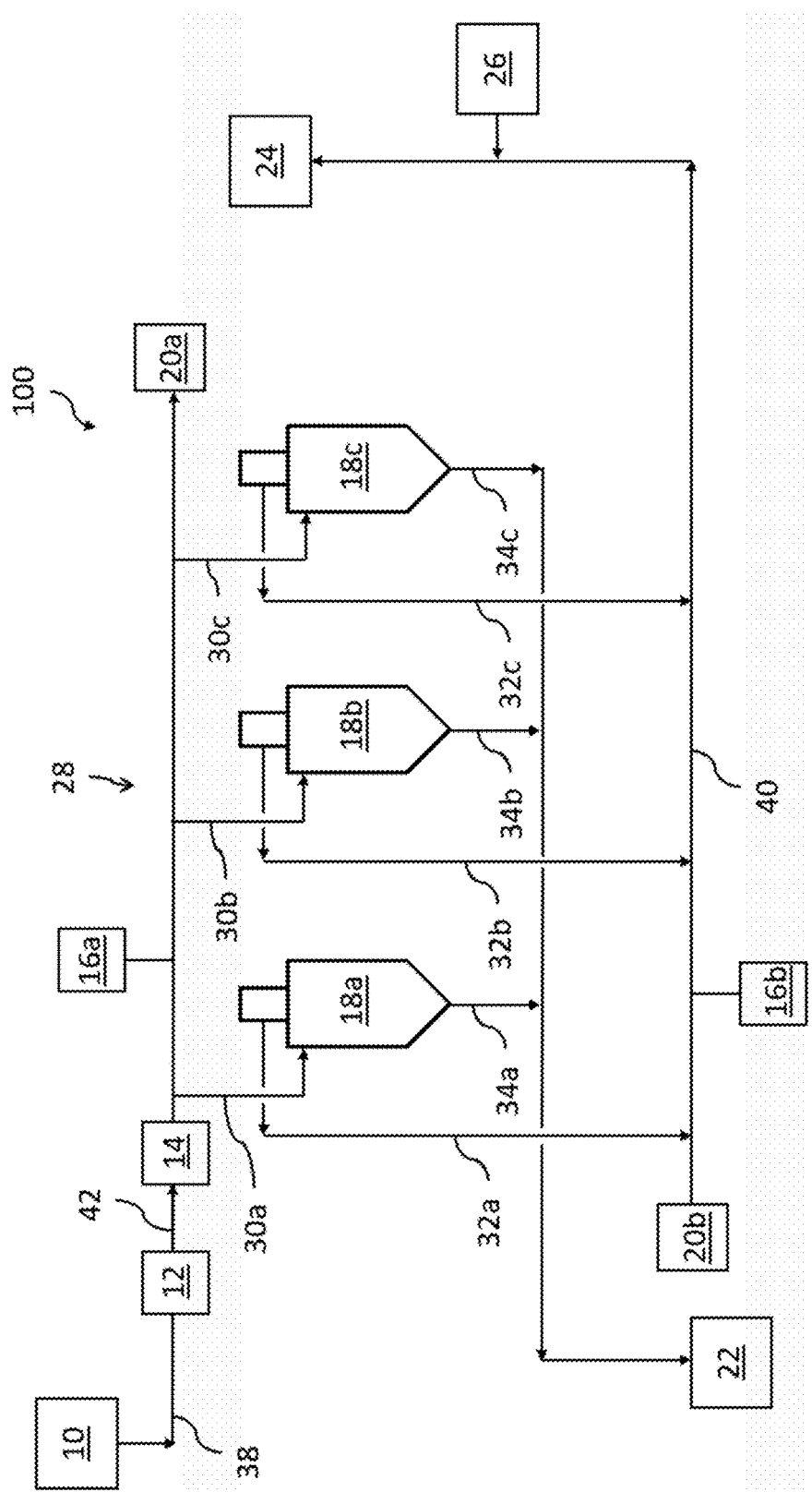
FIG. 1 is a schematic diagram of an agricultural processing system according to an embodiment of the present disclosure.

The following disclosure provides many different embodiments or examples. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed. While the present disclosure is described herein with reference to illustrative embodiments for particular applications, it should be understood that embodiments are not limited thereto. Other embodiments are possible, and modifications can be made to the embodiments within the spirit and scope of the teachings herein and additional fields in which the embodiments would be of significant utility.

Referring to FIG. 1, a separator system 100 for use in agricultural processing is shown. The system includes an inlet supply 10, which supplies a liquid to be treated. In one or more embodiments, the liquid is an aqueous suspension comprising one or more insoluble components. For example, the insoluble components may comprise feathers, fecal matter, ingesta, and/or fats. In one or more embodiments, the inlet supply 10 is in fluid communication with a process that uses water, such as a scalder tank, a food washing station such as an inside outside bird washer, a chiller or dip tank, or a combination thereof. The inlet supply 10 directs the liquid to a pump 12, which pumps the fluid to a manifold 28 at a desired velocity and pressure.

In the system 100, the liquid is directed from the manifold 28 through inlet lines 30a, 30b, 30c to separators 18a, 18b, 18c that are configured to clean the liquid by separating insolubles therefrom. The separators 18a, 18b, 18c include underflow lines 34a, 34b, 34c through which the insolubles exit the separators 18a, 18b, 18c and overflow lines 32a, 32b, 32c through which the cleaned liquid exits the separators 18a, 18b, 18c. The insolubles may be directed to an underflow hopper 22 while the cleaned liquid is directed to an outlet 24 for use within the agricultural processing plant.

The pump 12 is configured to pump the liquid at a proper rate and/or pressure in order to obtain the centripetal force and centrifugal force needed to separate insolubles from the liquid in separators 18a, 18b, 18c. In some embodiments, the pump 12 is a centrifugal pump capable of pumping at 10-250 gallons per minute (gpm), 50-200 gpm, 75-150 gpm, at least 10 gpm, at least 15 gpm, at least 25 gpm, at least 50 gpm, at least 75 gpm, or at least 100 gpm.

The connections between various components of the system 100 are not particularly limited and, in some embodiments, the connections may comprise tubing of various diameters and lengths. In some embodiments, a line 38 connecting the inlet supply 10 to the pump 12 comprises tubing that is about 4" in diameter proximate the inlet supply 10 and that reduces to about 2" in diameter proximate the pump 12. In some embodiments, the pump 12 may output the liquid through line 42 having a diameter of about 2" that feeds into a plenum of the manifold 28 having a diameter of about 3". In some embodiments, inlet lines 30a, 30b, 30c from the manifold 28 have a diameter of about ½". In some embodiments, overflow lines 32a, 32b, 32c may comprise about ¾" tubing that manifolds into a line 40 having a diameter of about 3" that reduces to a diameter about 2" prior to reaching the outlet 24.

The manifold 28 directs the liquid from the pump 12 to the plurality of separators 18a, 18b, 18c via inlet lines 30a, 30b, 30c. Although three separators 18a, 18b, 18c are shown in FIG. 1, the system 100 may include any number of separators. In some embodiments, the manifold 28 is excluded and the system 100 only includes a single separator. In other embodiments, the system includes two, four, five, six, seven, or eight or more separators. Each separator 18a, 18b, 18c may be a centripetal solid/liquid separator that does not include any moving parts, which thereby reduces maintenance costs. Suitable separators include those available from Compatible Components Corporation under the tradename VORSPIN. The separators 18a, 18b, 18c may be suitably selected based on the operating needs of the system 100. For example, larger separators 18a, 18b, 18c may be able to process larger volumes of liquid, i.e., be operated at a greater operating pressure and process rate. However, in general, larger separators are not as efficient at removing small particulates. In some embodiments, the separators 18a, 18b, 18c are capable of removing particulates having sizes of greater than about 7 microns, about 7 to about 18 microns, about 7 to about 10 microns, greater than about 10 microns, about 10 to about 12 microns, greater than about 12 microns, about 12 to about 17 microns, greater than about 15 microns, or about 15 to about 18 microns. In some embodiments, the separators 18a, 18b, 18c are configured to operate at a pressure of 20-100 psig, 30-80 psig, 30-60 psig, psig, 30-40 psig, 40-45 psig, 40-50 psig, or 45-60 psig. In some embodiments, the separators 18a, 18b, 18c are configured to operate at a process rate of at least 10 gpm, at least 20 gpm, at least 30 gpm, at least 40 gpm, at least 50 gpm, at least 60 gpm, 10-120 gpm, 20-100 gpm, 30-80 gpm, or 40-70 gpm. When connected in parallel as shown in FIG. 1, the separators 18a, 18b, 18c typically have the same configuration since the liquid is supplied to the separators 18a, 18b, 18c at the same rate from the pump 12.

In one or more embodiments, the inlet supply 10 is a tank or other vessel having a set volume of liquid. In such embodiments, the system 100 may be configured based on a desired turnover rate of the volume of liquid. For example, for a 1500-gallon volume of liquid, three separators 18a, 18b, 18c each operating at 50 gpm would process the entire volume (i.e., complete one turnover) in 10 minutes whereas operating only two of the same separators would take 20 minutes to complete one turnover. In one or more embodiments, the system 100 is configured to have a turnover rate of at least 0.1/hr, at least 0.25/hr, at least 0.5/hr, at least 1/hr, at least 1.5/hr, at least 2/hr, at least 3/hr, at least 4/hr, at least 5/hr, or at least 6/hr. Higher turnover rates generally lead to reduced microbial counts and may help reduce maintenance by maintaining a cleaner liquid.

After the liquid enters the separators 18a, 18b, 18c, centrifugal separation occurs wherein an underflow of insoluble materials is expelled through underflow lines 34a, 34b, 34c. The underflow lines 34a, 34b, 34c may be manifolded and directed to an underflow hopper 22 for disposal or recycling. Cleaned fluid exits at the top of the separators 18a, 18b, 18c through overflow lines 32a, 32b, 32c. The cleaned fluid is then directed to an outlet 24, which may be in fluid communication with the same process as that of the inlet supply 10 (i.e., may add back cleaned fluid to the process) or the cleaned fluid may be directed from the outlet 24 to another process within the agricultural processing plant as needed.

In one or more embodiments, the system 100 includes one or more inlet sensors for measuring conditions of the liquid being supplied into the system 100 and one or more outlet sensors for measuring conditions of the cleaned liquid being outputted by the system 100. For example, the inlet sensors may include a flow and temperature sensor 14, which may be positioned between the pump 12 and the separators 18a, 18b, 18. The inlet sensors may also include an inlet pressure sensor 16a positioned between the pump 12 and the separators 18a, 18b, 18c. The outlet sensors may include, for example, an outlet pressure sensor 16b positioned after the separators 18a, 18b, 18c to measure conditions of the cleaned liquid. The outlet sensors may also include a flow meter or temperature sensor (not shown). Each of the sensors may be in wired or wireless communication with a control panel (not shown), thereby providing real time information to a user. The real time information displayed on the control panel may include, for example, operating speeds (flow rates) and water savings based on the output rate of cleaned liquid. In some embodiments, the control panel may be partially or wholly automated, wherein measurements exceeding predetermined threshold values (too high or too low) cause one or more actions to be performed by the control panel. For example, an abnormal temperature reading may cause the control panel to produce an alarm or to shut down the system 100. Excessive temperatures of liquids used for poultry processing may begin to melt fats or cook the poultry, which is undesirable. Further, high temperatures might overheat the pump 12. Conversely, in scalding operations, liquids that are too cool will cause feathers to not pick. In some embodiments, the inlet supply 10 is in communication with a chiller tank and the threshold maximum temperature is 50° F., 45° F., 40° F., or 35° F. In some embodiments, the inlet supply 10 is in communication with a scalder tank and the threshold maximum temperature is 150° F., 160° F., or 170° F. and the threshold minimum temperature is 110° F., 120° F., or 130° F.

As another example, an abnormal output pressure reading may cause the control panel to change the rate at which the pump 12 operates and/or produce an alarm or shut down the system 100. If the measured pressure is too high or too low at the inlet or outlet of the system 100, it could be indicative of a blockage within the system 100. In some embodiments, a threshold minimum pressure measured at outlet pressure sensor 16b is 5 psig, 4 psig, 3 psig, or 2 psig. In some embodiments, a threshold maximum pressure measured at outlet pressure sensor 16b is 10 psig, 8 psig, or 6 psig.

In some embodiments, the control panel comprises a variable frequency drive (VFD) configured to control the speed of the pump 12. The VFD may be manually or automatically operated. In an embodiment, a user would review data at the control panel to ensure that measurements from pressure sensors 16a and 16b are within predetermined ranges based on the specifications of the separators 18a, 18b, 18c, verify that a flow rate measured by sensor 14 meets process demands, and then adjust the VFD as needed. In some embodiments, the VFD frequency is not to exceed 60 Hz.

In some embodiments, the system 100 includes an inlet sample port 20a for sampling the liquid being provided into the system 100 and/or an outlet sample port 20b for sampling the cleaned liquid being outputted by the system 100. The sample ports 20a and 20b may be used for periodic quality control, wherein the sampling may be manual or automated. Sampling data may include, for example, microbial content, pH, solids content, and/or turbidity of the sampled liquid. In some embodiments, the sampling data may be used to establish Statistical Process Control (SPC) parameters, which may then be used to monitor the system 100. In one or more embodiments, sampling is automated and sampling data is communicated to the control panel where it may be viewed by a user and/or may cause an automated response such as an alarm, for instance, when data values fall outside of established SPC parameters.

In one or more embodiments, the system 100 includes a supply 26 configured to inject an additive to the cleaned liquid. In some embodiments, the additive is an antimicrobial, a pH adjuster, or fresh water. The supply 26 may be operated as needed in view of the measured conditions of the system 100.

Figure 2:
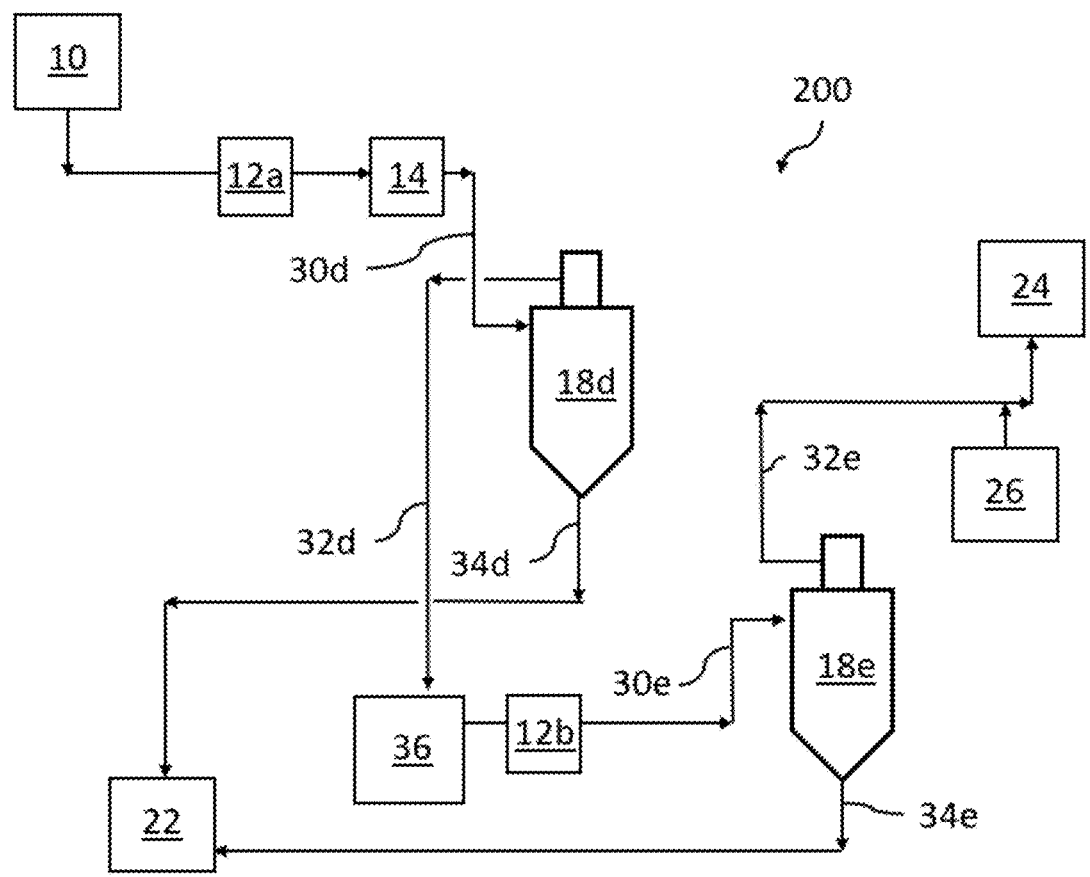
FIG. 2 is a schematic diagram of an agricultural processing system according to an embodiment of the present disclosure.

Turning to FIG. 2, in an alternative system 200, the separators 18d, 18e may be configured in series. Namely, in the system 200, liquid from the inlet supply 10 is directed to first pump 12a, which may be as described above. The liquid is transported from the first pump 12a via line 30d to the first separator 18d. The liquid is cleaned in the first separator 18d such that a cleaned overflow is directed from overflow line 32d into a tank 36. The liquid in tank 36 is then pumped by a second pump 12b, which may the same type as the first pump 12a, via line 30e to the second separator 18e. Each of the separators 18d, 18e produce an underflow through underflow lines 34d, 34e which may be directed to an underflow hopper 22 to be discarded or recycled. In some embodiments, in order to reduce maintenance due to potential blockage in the underflow lines 34d, 34e, the system 200 may exclude the underflow lines 34d, 34e with the underflow from separators emptying directly into an underflow hopper 22. The overflow from the second separator 18e comprises twice cleaned liquid that may be directed via overflow line 32e to the outlet 24. Although two separators 18d, 18e are shown in FIG. 2, the system 200 may include as many separators as desired, wherein each separator includes its own supply tank to collect liquid from the previous separator and a pump to direct the liquid from the tank.

In one or more embodiments, each of the separators 18d, 18e in the system 200 may be the same or different. For example, the first separator 18d may be larger than the second separator 18e such that the first separator 18d is configured to remove larger insolubles and the second separator 18e is configured to remove smaller remaining insolubles.

In some embodiments, either or both of the separators 18d, 18e of the system 200 may comprise a plurality of separators connected in parallel (as in FIG. 1). In any of the foregoing embodiments, the separators 18d, 18e may be configured to operate at the same rate in order to maintain constant liquid levels throughout the system 200. For example, the first separator 18d may comprise a single separator configured to operate at a first rate and the second separator 18e may comprise to separators each configured to operate at half of the first rate.

EXAMPLES

Example 1—Turbidity Analysis

Three water samples were taken from a scalder every hour over four production days—two day using the separator system described here and two control days without the separator system. Each sample was analyzed for turbidity for a total of 99 samples (54 example samples and 45 control samples). As summarized in Tables 1 and 2 below, turbidity differed across trial days in several dimensions: mean daily turbidity was lower in treatment days compared to control days, as was maximum daily turbidity and the daily variance in turbidity.

TABLE 1

Daily turbidity measures (in Nephelometric Turbidity Units (NTU))

|  | Mean | Min | Max | Std. Dev. |
|---|---|---|---|---|
| Example 1 Day 1 | 109.1 | 23.4 | 266.7 | 47.4 |
| Example 1 Day 2 | 190.0 | 24.6 | 295.7 | 82.9 |
| Control Day 1 | 242.7 | 6.4 | 418.0 | 110.0 |
| Control Day 2 | 248.6 | 43.1 | 393.3 | 116.6 |

TABLE 2

Difference in turbidity measures by treatment (in NTU)

|  | Control | Example 1 | Difference | p-value |
|---|---|---|---|---|
| Mean | 245.9 | 145.1 | −100.6 (−41.0%) | p < 0.01 |
| Std. Dev. | 112.5 | 76.6 | −35.9 (−31.9%) | p < 0.01 |

In Table 2, the difference is statistically significant at p<0.05.

Figure 3:
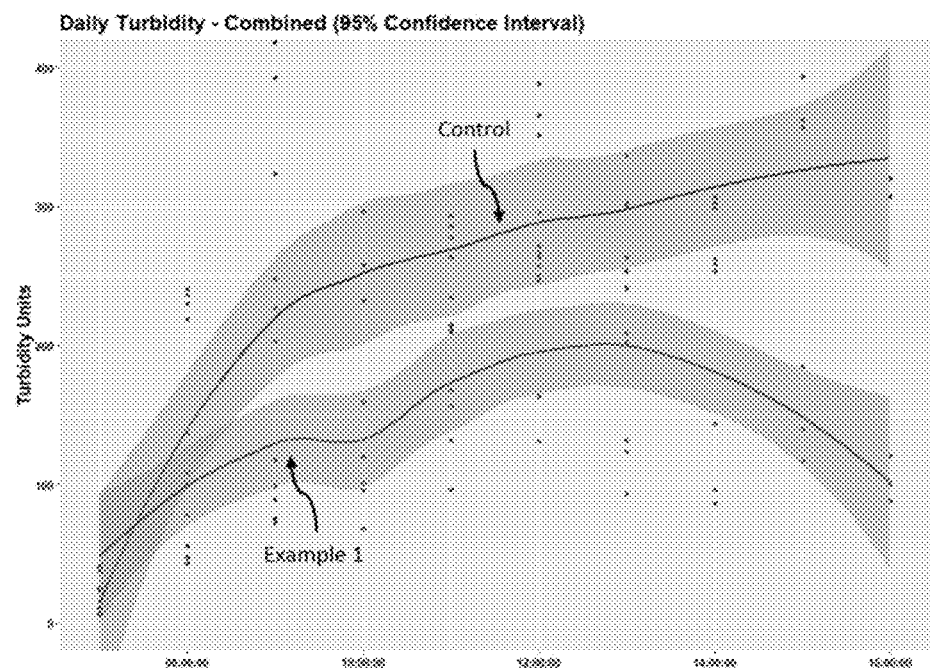
FIG. 3 is a graph depicting the results of Example 1.

During the above tests, it was observed that water turbidity increased very quickly within the first two hours on control days from <100 NTU to 225 NTU and continued to increase throughout the rest of the day, reaching a high of ~340 NTU by the end of the day. Water turbidity increased much more slowly on days using the separator system, reaching only 125 NTU after the first two hours; it continued to rise slowly, reaching a maximum of 200 NTU (40% lower than the maximum on control days) between 12:00 noon and 1:00 μm, and fell back to 100 NTU by the end of the day. Water turbidity had statistically significantly less variation on days using the separator system (i.e., measurements were more tightly grouped together). The results of Example 1 are depicted in FIG. 3, wherein the top line represents the control data, and the bottom line represents the data using the separator system.

Example 2—Microbial Analysis

Figure 4:
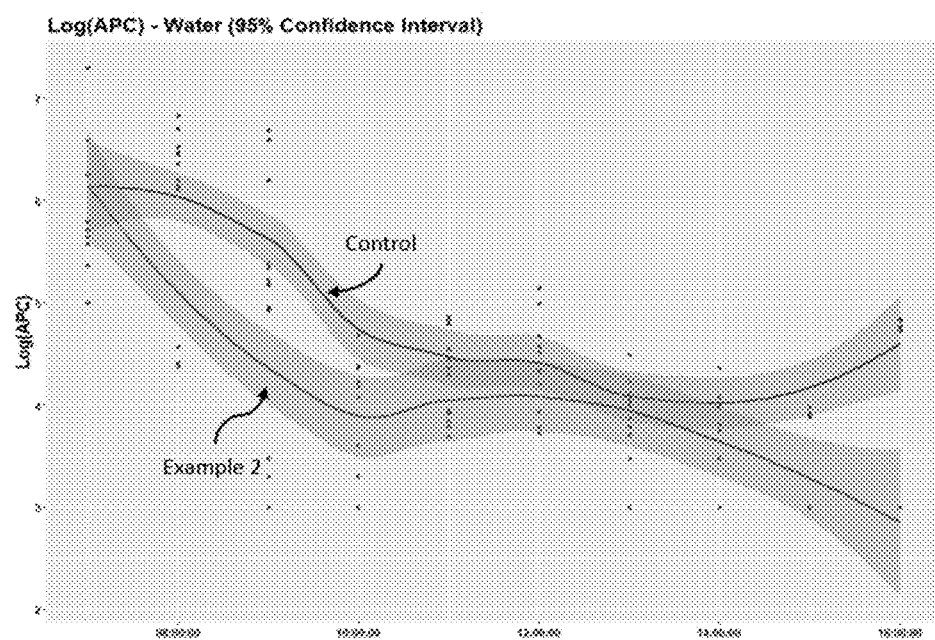
FIG. 4 is a graph depicting the results of Example 2.
Figure 5:
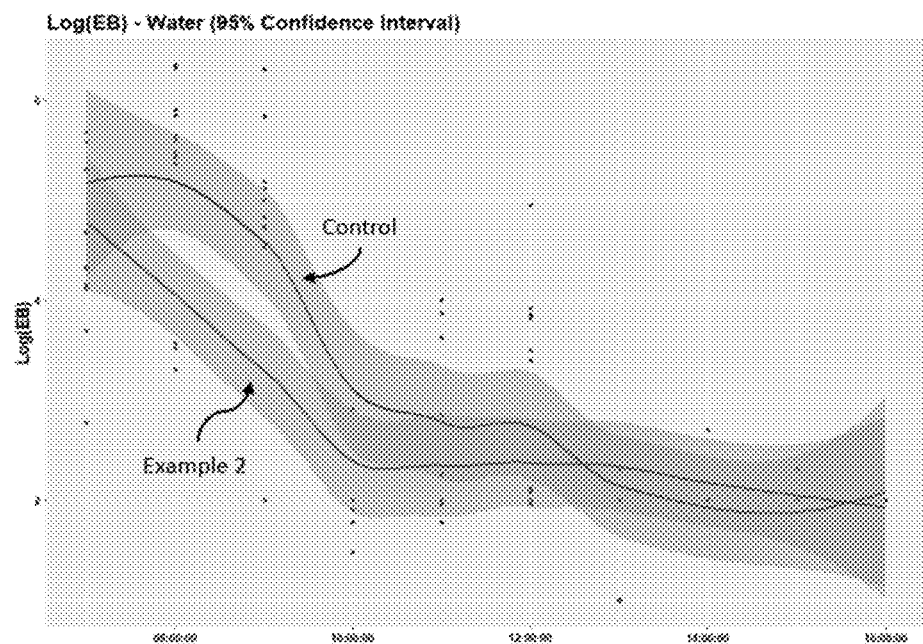
FIG. 5 is a graph depicting the results of Example 2.

The samples described in Example 1 were tested for bacterial loads, namely Aerobic Plate Count (APC) and Enterobacteriaceae count (EB). The results are summarized in Table 3 below. The results are also shown in FIG. 4 and FIG. 5. As compared with the control days, the days using the separator system provided statistically significant reductions in both APC and EB loads in the scalder water.

TABLE 3

Scalder water bacterial results

|  | Difference between Control and Example 2 | Std. Error | p-value |
|---|---|---|---|
| Log(APC) | −0.65 logs | 0.15 | p < 0.0001 |
| Log(EB) | −0.44 logs | 0.22 | p = 0.0452 |

Example 3—Solids Analysis

Figure 6:
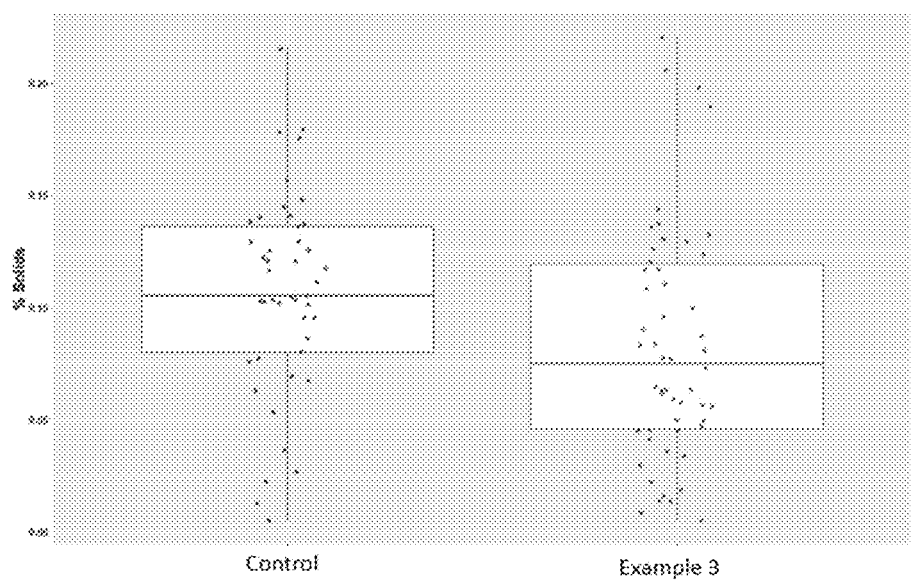
FIG. 6 is a graph depicting the results of Example 3.
Figure 7:
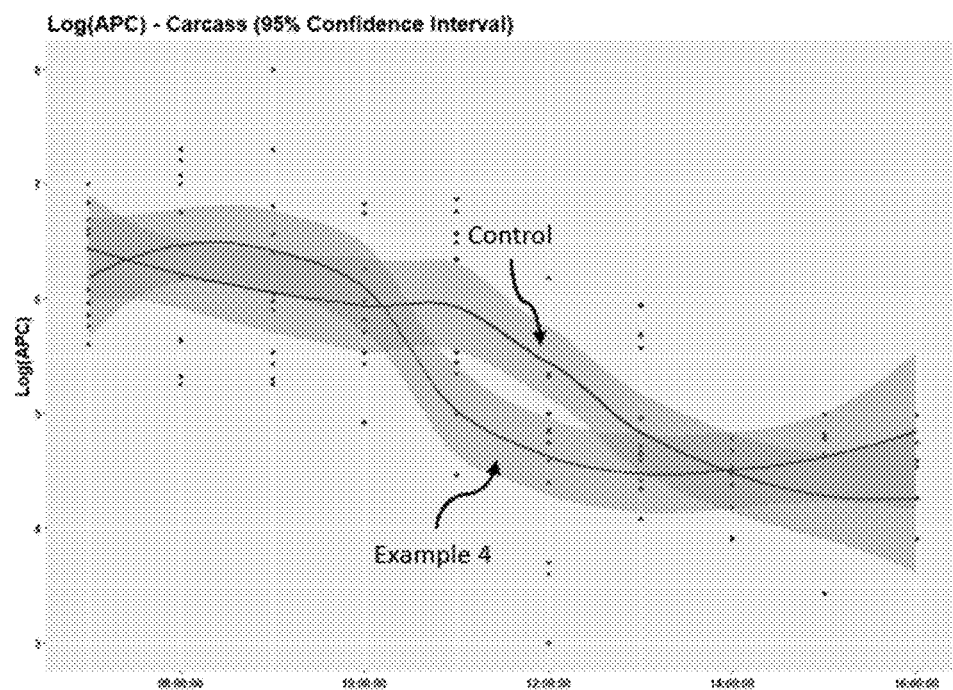
FIG. 7 is a graph depicting the results of Example 4.
Figure 8:
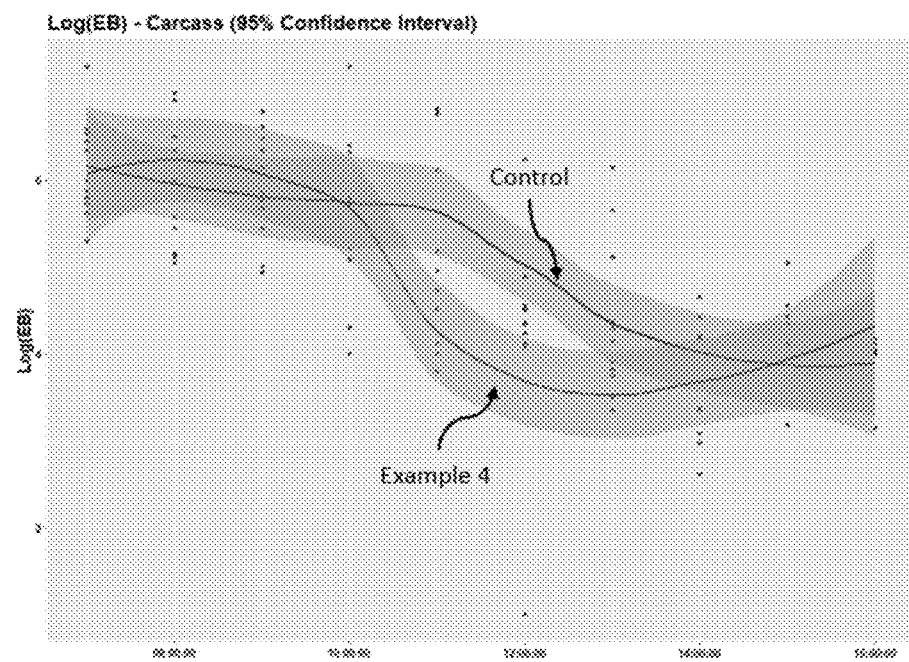
FIG. 8 is a graph depicting the results of Example 4.
Figure 9:
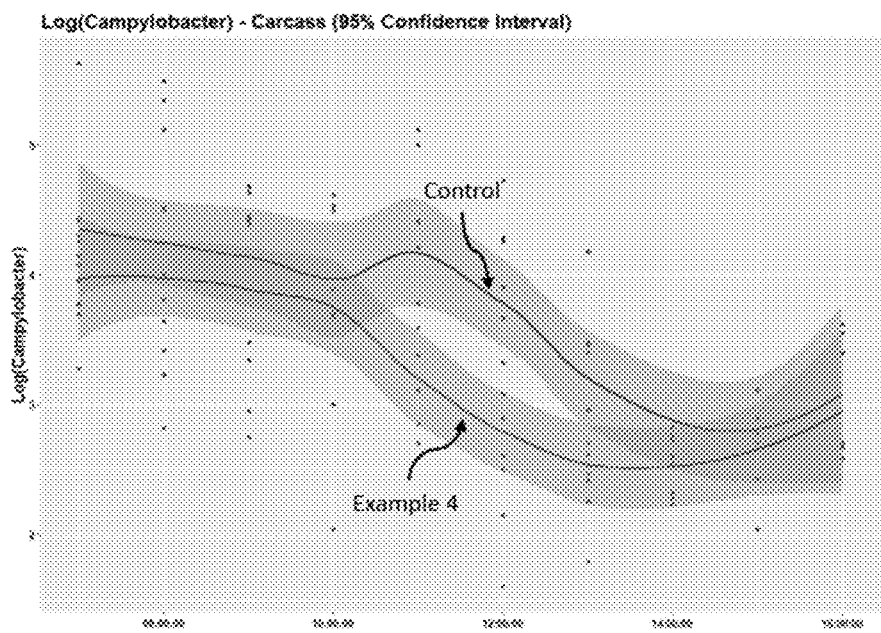
FIG. 9 is a graph depicting the results of Example 4.
Figure 10:
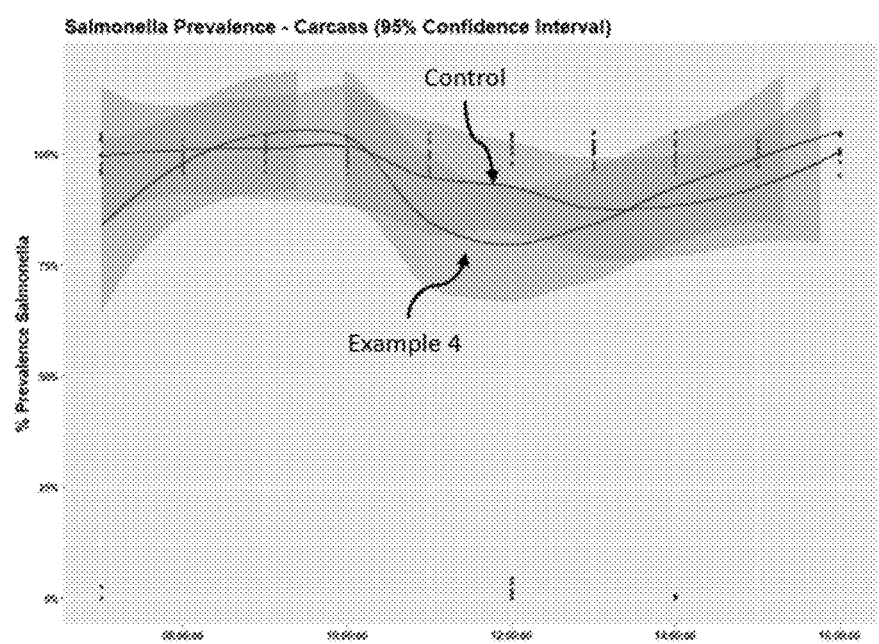
FIG. 10 is a graph depicting the results of Example 4.

The samples described in Example 1 were analyzed for solid content. The percent solids differed significantly and was lower in Example 3 as compared to the control group. The results are summarized in Table 4 below and shown in FIG. 6.

TABLE 4

Difference in water solids measurements by treatment

|  | Control | Example 3 | Difference | p-value |
|---|---|---|---|---|
| % Solids | 0.106 | 0.083 | −0.023 (−21.7%) | p = 0.0174 |

Example 4

Three carcass samples were taken at hot rehang every hour over four production days—two day using the separator system described here and two control days without the separator system. Each sample was analyzed for APC, EB, Campylobacter, and Salmonella for a total of 99 samples each (54 separator system samples and 48 control samples).

After aggregating bacterial results across days and comparing the separator system performance to the control performance there was a numerical reduction in all measures. The effect of the separator system is shown in Table 5 below as the estimated reduction in bacterial loads (or prevalence, in the case of Salmonella) due to the separator system when incoming variables are held constant. Statistically significant reductions in both EB and Campylobacter loads at hot rehang were found for the separator system.

TABLE 5

Hot rehang bacterial results

|  | Effect of Separator System | Std. Error | p-value |
|---|---|---|---|
| Log(APC) | −0.11 logs | 0.14 | p = 0.4560 |
| Log(EB) | −0.35 logs | 0.20 | p = 0.0443 |
| Log(Campy) | −0.49 logs | 0.13 | p = 0.0006 |
| Salmonella | −3.2% | 4.7% | p = 0.5001 |

Turbidity results from Example 1 suggest that the differences in water quality due to the separator system become statistically significant after approximately 90 minutes of use. Without being bound by theory, it is hypothesized that prior to 90 minutes the water quality in the scalder is still "clean" due to daily water change and limited use. After 90 minutes, the control scalder becomes substantially more turbid compared to the separator system-enabled scalder and continues to decline in quality over the course of the day. Thus, the "true" effect of the separator system becomes identifiable within the second hour of testing.

Based on the foregoing, the hot rehang results from Table 5 were restricted to carcasses processed during the period of time (most of the day) in which the separator system-enabled scalder was significantly less turbid than the control and the above analysis was repeated, as shown in Table 6 below. It was found that a greater reduction in load for both outcomes that were statistically significant in the prior analysis (EB and Campylobacter) and the results were again statistically significant.

TABLE 6

Hot rehang bacterial results after separator system improves turbidity

|  | Effect of Separator System | Std. Error | p-value |
|---|---|---|---|
| Log(APC) | −0.23 logs | 0.18 | p = 0.2100 |
| Log(EB) | −0.58 logs | 0.28 | p = 0.0465 |

TABLE 6-continued

Hot rehang bacterial results after separator system improves turbidity

|  | Effect of Separator System | Std. Error | p-value |
|---|---|---|---|
| Log(Campy) | −0.53 logs | 0.17 | p = 0.0030 |
| Salmonella | −1.6% | 6.7% | p = 0.8112 |

Interestingly, the clearest separation in bacterial metrics occurs between 10:00 and 14:00 for APC, EB, and Campylobacter, as shown in FIG. 7, FIG. 8, FIG. 9, and FIG. 10.

A system for processing food, such as meat, poultry, or vegetables, has been disclosed herein. The system includes a process that uses water and produces wastewater comprising insoluble solids; a pump configured to receive and pressurize the wastewater from the process; and a plurality of centrifugal separators connected in parallel and configured to receive the wastewater from the pump. The separators are each configured to separate out at least a portion of the insoluble solids from the wastewater to produce a cleaned wastewater.

The system may include any combination of the following features: the insoluble solids comprise poultry or other feed, dirt, litter, fecal matter, viscera, entrails, skin, fats, and/or digesta; one or more sensors in communication with a control panel, the control panel comprising a display configured to display data from the one or more sensors; wherein the one or more sensors comprise a temperature sensor, a pressure sensor, a flow rate sensor, or a combination thereof; a sample port positioned between the pump and the separators, the sample port configured to receive and analyze a sample of the wastewater; wherein the sample port is configured to measure turbidity, pH, solids content, microbial content, or a combination thereof and to transmit measurements to the control panel; wherein the control panel comprises a variable frequency drive configured to control a speed of the pump and wherein the variable frequency drive is controllable via the control panel; wherein the process is an inside outside bird washer or other food washing process, a chiller, an antimicrobial application process, or a scalder; wherein the cleaned wastewater is recycled into the process; an additive supply configured to introduce an antimicrobial, a pH adjuster, and/or fresh water into the cleaned wastewater.

An agricultural processing system has been described herein. The system includes a process that uses water and produces wastewater comprising insolubles; a first pump configured to receive and pressurize the wastewater from the process; a first centrifugal separator configured to receive the wastewater from the first pump and separate out at least a portion of the insolubles from the wastewater to produce a once-cleaned wastewater; a tank configured to receive and hold the once-cleaned wastewater; a second pump configured to receive and pressurize the once-cleaned wastewater from the tank; and a second centrifugal separator configured to receive the once-cleaned wastewater from the second pump and separate out at least a portion of the insolubles from the once-cleaned wastewater to produce a twice-cleaned wastewater.

The system may include any combination of the following features: wherein the first centrifugal separator is configured to remove insolubles having at least a first diameter and the second centrifugal separator is configured to remove solid particles having at least a second diameter; and wherein the second diameter is smaller than the first diameter; wherein at least one of the first centrifugal separator or the second centrifugal separator comprises a plurality of centrifugal separators connected in parallel.

A method of processing food has been described herein. The method includes contacting food workpieces with water to produce wastewater comprising insoluble solids dislodged from the workpieces; using a pump to direct the wastewater to a plurality of centrifugal separators; using the separators to remove at least a portion the insoluble solids from the water to produce a cleaned wastewater; and recycling the cleaned wastewater.

The method may include any combination of the following features: wherein the insoluble solids comprise poultry or other feed, dirt, litter, fecal matter, viscera, entrails, skin, fats, and/or digesta; wherein contacting the food workpieces with water comprises immersing the workpieces in a chiller tank; wherein contacting the food workpieces with water comprises immersing the workpieces in a scalder; wherein the plurality of centrifugal separators are connected in series and each of the separators is identical; wherein recycling the cleaned wastewater comprises returning the cleaned wastewater to the chiller tank; wherein recycling the cleaned wastewater comprises returning the cleaned wastewater to the scalder.

The above specific example embodiments are not intended to limit the scope of the claims. The example embodiments may be modified by including, excluding, or combining one or more features or functions described in the disclosure. The description of the present disclosure has been presented for purposes of illustration and description but is not intended to be exhaustive or limited to the embodiments in the form disclosed. Many modifications and variations will be apparent to those of ordinary skill in the art without departing from the scope and spirit of the disclosure. The illustrative embodiments described herein are provided to explain the principles of the disclosure and the practical application thereof, and to enable others of ordinary skill in the art to understand that the disclosed embodiments may be modified as desired for a particular implementation or use. The scope of the claims is intended to broadly cover the disclosed embodiments and any such modification.

What is claimed is:

1. An agricultural processing system, comprising:
   an inlet supply for supplying a liquid to be treated, wherein the liquid comprises an aqueous suspension comprising insoluble solids;
   the inlet supply is in fluid communication with a process that uses water and produces wastewater comprising the insoluble solids, wherein the process is a chiller, a scalder, or a food washing process;
   a pump configured to receive and pressurize the wastewater from the process;
   a plurality of centrifugal separators connected in parallel and configured to receive the wastewater from the pump; and
   one or more sensors in communication with a control panel, the control panel comprising a display configured to display data from the one or more sensors;
   wherein the separators are each configured to separate out at least a portion of the insoluble solids from the wastewater to produce a cleaned wastewater; and
   wherein the cleaned wastewater is recycled into the process.

2. The system of claim 1, wherein the insoluble solids comprise animal feed, dirt, litter, fecal matter, viscera, entrails, skin, fats, and/or digesta.

3. The system of claim 1, wherein the one or more sensors comprise a temperature sensor, a pressure sensor, a flow rate sensor, or a combination thereof.

4. The system of claim 1, further comprising a sample port positioned between the pump and the separators, the sample port configured to receive and analyze a sample of the wastewater.

5. The system of claim 4, wherein the sample port is configured to measure turbidity, pH, solids content, microbial content, or a combination thereof and to transmit measurements to the control panel.

6. The system of claim 1, wherein the control panel comprises a variable frequency drive configured to control a speed of the pump and wherein the variable frequency drive is controllable via the control panel.

7. The system of claim 1, further comprising an additive supply configured to introduce an antimicrobial, a pH adjuster, and/or fresh water into the cleaned wastewater.

* * * * *

UNITED STATES PATENT AND TRADEMARK OFFICE
CERTIFICATE OF CORRECTION

| | | |
|---|---|---|
| PATENT NO. | : 12,351,489 B2 | Page 1 of 1 |
| APPLICATION NO. | : 17/454908 | |
| DATED | : July 8, 2025 | |
| INVENTOR(S) | : Steve Huff et al. | |

It is certified that error appears in the above-identified patent and that said Letters Patent is hereby corrected as shown below:

In the Specification

Column 6, Line 33, change "µm" to --pm--

Signed and Sealed this
Sixth Day of January, 2026

John A. Squires
*Director of the United States Patent and Trademark Office*